(12) United States Patent
Kitamura et al.

(10) Patent No.: US 7,588,364 B2
(45) Date of Patent: Sep. 15, 2009

(54) SPREAD ILLUMINATING APPARATUS OF MULTIPLE PANEL TYPE

(75) Inventors: Atsushi Kitamura, Kitasaku-gun (JP); Shigeyuki Adachi, Kitasaku-gun (JP)

(73) Assignee: Minebea Co., Ltd., Kitasaku (JP)

( * ) Notice: Subject to any disclaimer, the term of this patent is extended or adjusted under 35 U.S.C. 154(b) by 0 days.

(21) Appl. No.: 11/898,728

(22) Filed: Sep. 14, 2007

(65) Prior Publication Data

US 2008/0101082 A1    May 1, 2008

(30) Foreign Application Priority Data

Oct. 26, 2006    (JP)   ............................ 2006-291478

(51) Int. Cl.
*G02B 6/10*      (2006.01)

(52) U.S. Cl. ..................... 362/616; 362/628; 362/224; 362/237; 362/612; 362/561

(58) Field of Classification Search ............... 362/616, 362/628, 224, 237, 238, 360, 612, 561, 551, 362/330; 349/73, 64
See application file for complete search history.

(56) References Cited

U.S. PATENT DOCUMENTS

| | | | |
|---|---|---|---|
| 5,808,708 A * | 9/1998 | Oyama et al. ................. 349/65 |
| 5,913,594 A | 6/1999 | Iimura | |
| 7,186,013 B2 * | 3/2007 | Jeong et al. ................. 362/555 |
| 7,188,988 B2 * | 3/2007 | Koganezawa ............... 362/616 |
| 2003/0184990 A1* | 10/2003 | Lin ............................. 362/31 |
| 2004/0047151 A1* | 3/2004 | Bogner et al. ............... 362/236 |
| 2004/0239580 A1 | 12/2004 | Nagatani et al. | |
| 2006/0262564 A1 | 11/2006 | Baba | |

| | | | |
|---|---|---|---|
| 2007/0165419 A1 | 7/2007 | Horiuchi et al. | |

FOREIGN PATENT DOCUMENTS

| | | |
|---|---|---|
| EP | 1 691 003 A2 | 8/2006 |
| GB | 2 259 359 A | 3/1993 |
| JP | A 5-303095 | 11/1993 |
| JP | A 7-191311 | 7/1995 |
| JP | A 9-282921 | 10/1997 |
| JP | A 10-247413 | 9/1998 |
| JP | A 11-203925 | 7/1999 |
| JP | A 2004-311219 | 11/2004 |
| JP | A 2004-319164 | 11/2004 |

(Continued)

*Primary Examiner*—Jong-Suk (James) Lee
*Assistant Examiner*—Leah S Lovell
(74) *Attorney, Agent, or Firm*—Oliff & Berridge, PLC

(57) ABSTRACT

A spread illuminating apparatus includes a plurality of lighting units each of which includes a light conductor plate having a light outlet surface and a light inlet surface, and a light source disposed at the light inlet surface, and which are arranged two dimensionally with a predetermined distance provided between every two adjacent lighting units. The spread illuminating apparatus further includes a plurality of light transmissive members each of which is provided with means to reflect and diffuse light from the light source, and each of which is disposed at the light outlet surface side of the lighting unit. Leakage light from the light source is reflected and disused by the light transmissive member thereby reducing stray light, and at the same time the light transmissive member receives the leakage light and emits it from the outlet surface as effective light thereby enhancing the overall brightness in a uniform manner.

8 Claims, 5 Drawing Sheets

FOREIGN PATENT DOCUMENTS

| | | |
|---|---|---|
| JP | B2 3653274 | 5/2005 |
| JP | A 2005-243522 | 9/2005 |
| JP | A 2005-251687 | 9/2005 |
| JP | A 2005-317873 | 11/2005 |
| JP | A 2006-228588 | 8/2006 |
| WO | WO 00/03271 A2 | 1/2000 |
| WO | WO 01/84046 A1 | 11/2001 |
| WO | WO 02/097324 A1 | 12/2002 |

* cited by examiner

F I G. 1
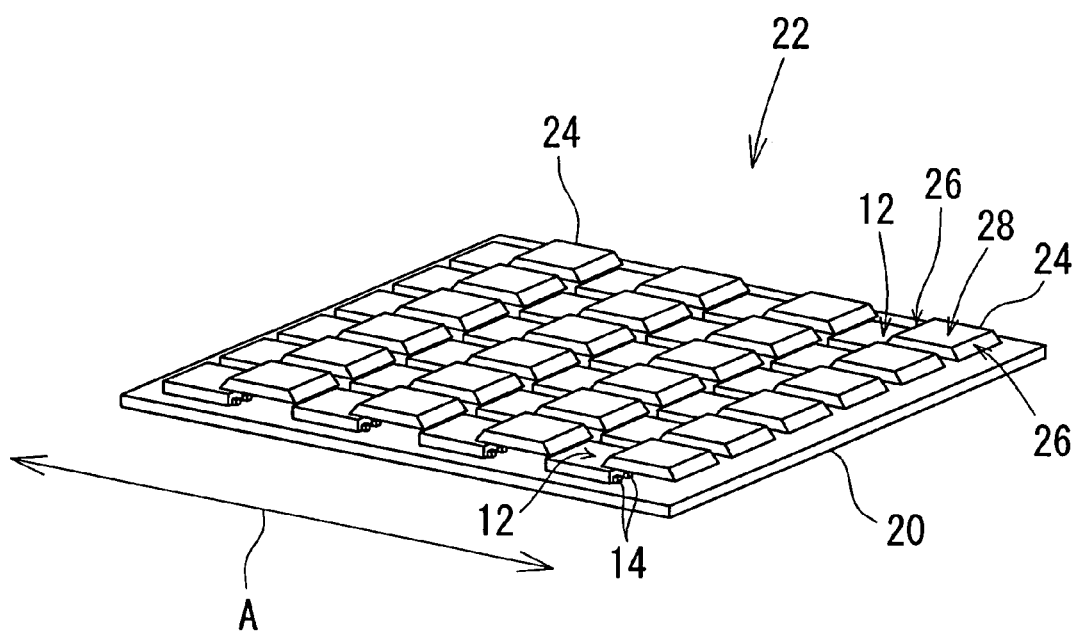

F I G. 2 A
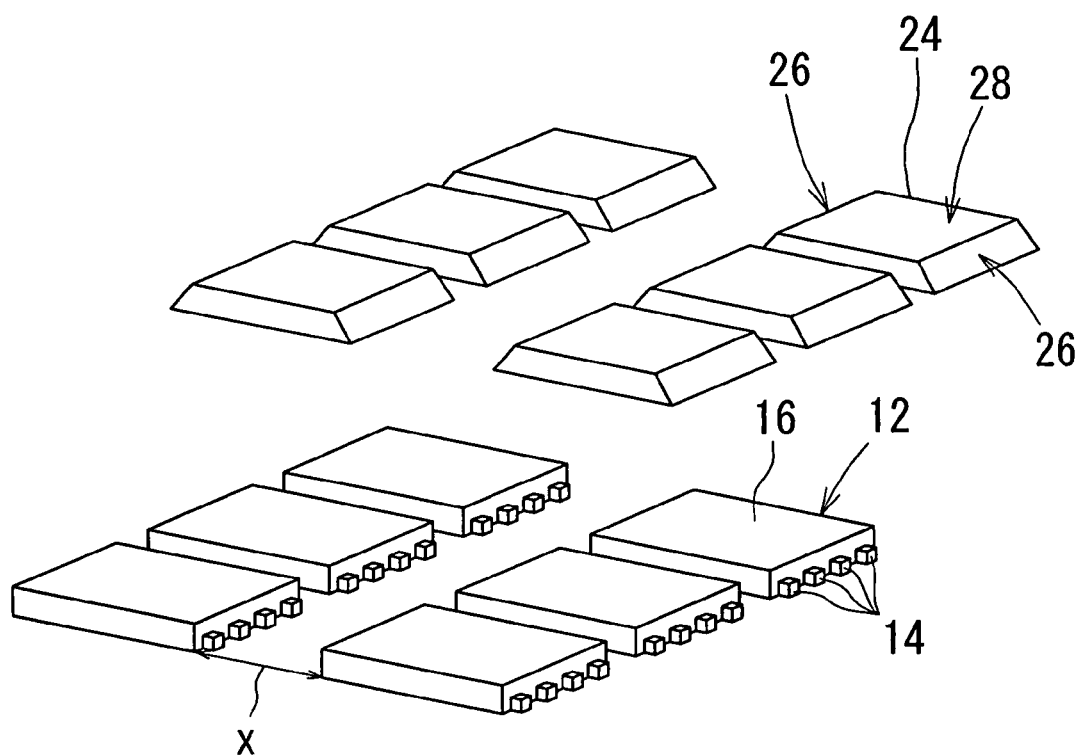
F I G. 2 B
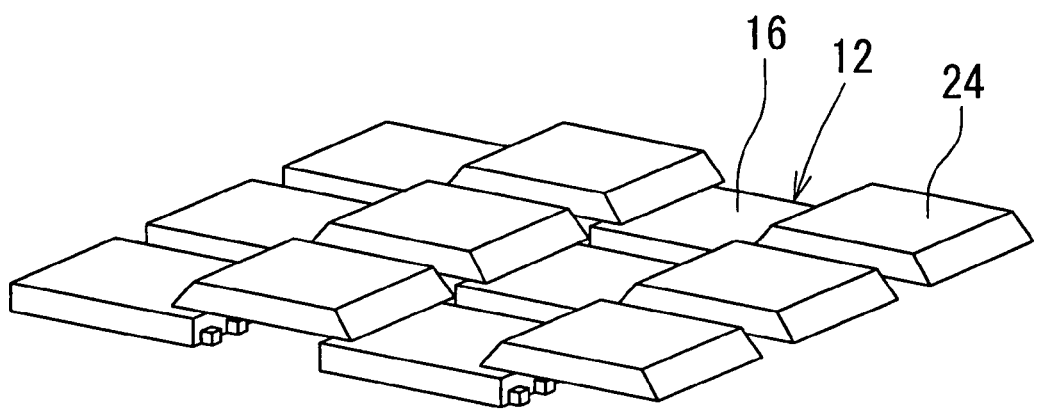

F I G. 5 A
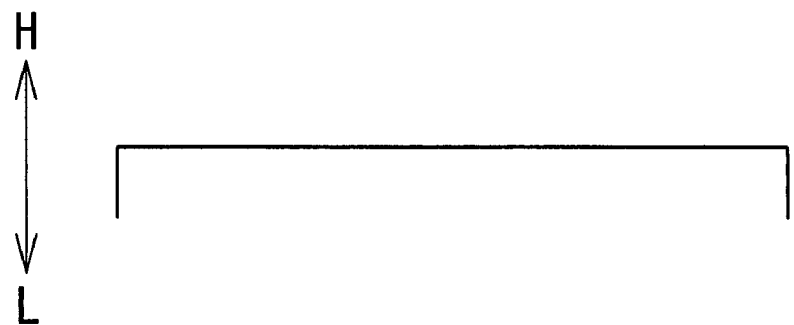

SPREAD ILLUMINATING APPARATUS OF MULTIPLE PANEL TYPE

BACKGROUND OF THE INVENTION

1. Field of the Invention

The present invention relates to a spread illuminating apparatus suitable for use as backlight unit of a liquid crystal display device.

2. Description of the Related Art

A liquid crystal display (LCD) device is used extensively as a display device for various electronic devices and recently is increasingly superseding a cathode ray tube (CRT) also in a relatively large display device as typified by, for example, a personal computer and a TV set.

For such a large LCD device, a direct light type backlight has been conventionally predominant which is structured such that a plurality of cold cathode lamps (hereinafter referred to as CCFLs as appropriate) as light sources are disposed immediately beneath an LCD panel, and in which light is condensed by an optical sheet and light intensity is uniformed by a diffuser sheet (refer to, for example, Japanese Patent No. 3653274).

Recently, various approaches to be described below are attempted for improving picture image quality and enhancing performance in an LCD device, and accordingly a backlight is becoming required to offer less conventional features.

For example, as a means of solving the visibility issue of movie display on an LCD panel, what is called a "pseudo impulse driving method" is established, in which a black display period is forcibly inserted between every two adjacent frame periods of a picture image display, whereby the pixel brightness response of the LCD panel is brought close to the impulse response.

In the pseudo impulse driving method, it is proposed that the black display period be produced by turning off the backlight, in which case the backlight is required to be capable of turning on and off rapidly. Another proposed method to produce the black display period is to input a black write signal in a picture image signal per frame period, also in which case the backlight is preferably turned on and off rapidly in synchronization with the black write signal in order to achieve an efficient pseudo pulse impulse driving.

Especially, in case of an LCD panel with a rapid response, a method is proposed in which a black write signal is inserted in a picture image signal per scanning line at a predetermined timing, whereby a black region is displayed at an area of a screen composed of a plurality of successive scanning lines, and at the same time the position of the black region displayed is shifted in synchronization with the scanning of the picture image (hereinafter this method is referred to as "black insertion driving method" as appropriate). In this case, it is required that only an area of the entire luminous region of the backlight located immediately beneath the black region be selectively turned off in synchronization with the shifting of the black region.

Also, what is called an "area control method" is proposed, in which the lighting condition of the backlight is partly controlled for enhancing the contrast of a picture image and reducing the power consumption. In this method, the backlight is driven such that when a black region which does not need illumination is present in a picture image as a display tone factor, the area of the luminous region located immediately beneath the black region is selectively turned off.

Unlike the above-described black region (black display period) forcibly inserted for improving the movie display performance, the black region working as a display tone factor for picture image is caused to vary in shape and size on the screen. Consequently, in order to achieve an effective area control, the areas of the luminous region of the backlight, which are adapted to turn on and off independently of one another, must be configured sufficiently minute and precise.

Conventional backlights, however, have the following difficulties in keeping up with the aforementioned improvement of image quality and enhancement of performance.

In a direct light type backlight with CCFLs, since a CCFL has a low response speed, and since the number of CCFLs provided in a backlight is usually restricted, commonly it is difficult to achieve a backlight to suitably match a pseudo impulse driving (especially, the above-described black insertion driving method).

Also, in a direct light type backlight with CCFLs, the luminous region cannot be divided into individual areas in the direction orthogonal to the length of the CCFLs because of its structure, and therefore the areas which are allowed to be area-controlled are forced to be very inadequately sized and shaped.

Meanwhile, recently, a direct light type backlight is proposed which employs a number of red (R), green (G) and blue (B) light emitting diodes (LEDs) as light sources, in place of the CCFLs, arranged immediately beneath an LCD panel, wherein a white light is produced by mixing lights from these LEDs. Such a backlight can evade the above-described problems with respect to the pseudo impulse driving and the area control.

However, the photoelectric conversion efficiency is low in achieving a white light by mixing lights from red, green and blue LEDs, thus raising problems with power consumption, heat value from light sources, cost, and the like for achieving a white light with an adequate brightness. For solving the problems about power consumption, heat value from a light source, and cost, the present inventors have looked at a quasi-white LED in which a quasi-white light is produced by transmitting a light of a blue LED through a luminescent layer containing yttrium aluminum garnet (YAG) particles, and have come up with a proposal to incorporate the quasi-white LED in what is called an edge light type backlight, which includes a light conductor plate having a major surface as a light outlet surface and a side surface at which a light source is disposed.

The edge light type backlight, however, has a peculiar problem that light leakage occurs such that a ball-shaped light called "hot spot" leaks principally at an LED, and another problem that what is called a "stray light" to cause an intense emission line is generated at an area of the light conductor plate close to the light inlet surface, which degrades the quality of the light of the backlight.

Such a stray light problem can be overcome for an LCD panel with a relatively small display area, for example, a mobile phone LCD panel, in such a manner that the area significantly suffering from the stray light is defined as a non-effective area to be located outside the display area of the LCD, whereby the brightness can be kept uniform across the display area of the LCD. This solution, however, cannot be applied when a plurality of lighting units each constituted by an edge light type backlight are arranged two dimensionally thus forming a multiple panel type backlight to cover a large LCD panel. That is to say, it is not possible for the non-effective areas of all the lighting units to be located outside the display area of the LCD.

FIGS. 6A and 6B are respectively a schematic perspective view and an exploded perspective view of a conventional multiple panel type backlight 10 which includes a plurality (36 in the figures) of lighting units 12, wherein a plurality of strip-shaped cover films 18 (constituted by light shielding films or light reflecting films) are placed so as to cover the areas positioned above light sources (LEDs) 14 and light inlet surfaces of light conductor plates 16, thereby eliminating the influence of the stray light as much as possible. The multiple panel type backlight 10 further includes a rectangular light reflecting film 20 to entirely cover the lower surfaces of all the lighting units 12.

The technique of using light shielding films for the cover films 18 is for lowering the brightness of stray light by absorbing light energy, and therefore the entire brightness of the multiple panel backlight 10 is forced to be lowered. So, the brightness of the LED 14 must be increased in order to provide a sufficient brightness for the multiple panel backlight 10, which results in an increased power consumption. On the other hand, the technique of using light reflecting films for the cover films 18 is to reflect stray light back into the light conductor plate to thereby make an effective use of the light. The utilization efficiency, however, is low, and the brightness of the LED 14 must be increased in order to provide a sufficient brightness for the multiple panel backlight 10, thus inevitably increasing power consumption. And, since both the light shielding film and the light reflecting film used as the cover film 18 do not allow transmission of light, the very existence of the cover film 18 develops a dark area thus deteriorating the brightness uniformity.

SUMMARY OF THE INVENTION

The present invention has been made in light of the problems described above, and it is an object of the present invention to provide a spread illuminating apparatus of multiple panel type, in which the brightness can be surely kept uniform without influence of stray light while avoiding an increase in power consumption.

In order to achieve the object described above, according to an aspect of the present invention, a spread illuminating apparatus includes a plurality of lighting units each of which includes a light conductor plate having a major surface as a light outlet surface and a side surface as a light inlet surface, and a light source disposed at the light inlet surface of the light conductor plate, and which are arranged two dimensionally, and the spread illuminating apparatus described above further includes a plurality of light transmissive members each of which is provided with means to reflect and diffuse light from the light source, and each of which is disposed at the light outlet surface side of the lighting unit.

Due to the plurality of lighting units arranged two dimensionally, the spread illuminating apparatus described above constitutes a multiple panel type backlight with a large luminous area suitable for use as a backlight of a large LCD. Also, since the light transmissive members each provided with means to reflect and diffuse the light from the light source are disposed at the light outlet surface side of the lighting units, leakage light from the light source is reflected and diffused by the light transmissive member thus reducing stray light viewable from the light outlet surface of the light conductor plate, and at the same time the leakage light introduced into the light transmissive member are allowed to exit therefrom as effective light. Consequently, the brightness is enhanced in a uniform manner across the multiple panel backlight. The light transmissive member, unlike a cover film conventionally used to overcome stray light problems, is not required to shield or reflect light but is adapted to get light thereinto and remit it therefrom thus effectively utilizing stray light, which contributes to enhancing the overall brightness.

In the aspect of the present invention, the light transmissive members may each comprise: an inclined surface formed at at least one end thereof and working as a means to reflect the light from the light source; and a major surface working as a light outlet surface, and may function as a subsidiary light conductor plate.

Due to the inclined surface of the light transmissive member (subsidiary light conductor plate), hot spot light generated by the light source of the lighting unit or sharp emission line light generated at the light inlet surface area of the light conductor plate, which is introduced into the light transmissive member from its base surface, is reflected so as to have its optical path converted and to further travel in the light transmissive member, during which the light exits from the light outlet surface as effective light.

In the aspect of the present invention, the plurality of lighting units may be arranged such that a predetermined distance is provided between respective opposing ends of the light conductor plates of two lighting units adjacent to each other with respect to the direction orthogonal to the light inlet surface of the light conductor plate, and the light transmissive member may be disposed to bridge over the predetermined distance between the respective opposing ends of the light conductor plates of the two adjacent lighting units such that end regions of the light transmissive member sit on respective opposing end regions of the light conductor plates of the two adjacent lighting units.

Since the plurality of lighting units are arranged two dimensionally with the predetermined distance provided, rater than leaving no space, between the light conductor plates of every two adjacent lighting units with respect to one dimension, and since the light transmissive members are disposed to bridge over the predetermined distance, the spread illuminating apparatus successfully achieves a large luminous area. The light transmissive member contributes to reducing stray light viewable from the light outlet surface of the light conductor plate of the lighting unit, and at the same time receives and effectively utilizes leakage light from the light source thus enhancing the overall brightness. Also, due to the lighting units arranged with an open space provided between two adjacent lighting units, the number of the lighting units is reduced for the same area, and therefore power consumption is reduced.

In this connection, the light transmissive member may be configured to cover the open space defined by the predetermined distance for several sets of two adjacent lighting units, rather than one set of two adjacent lighting units. The light transmissive member may be fixed to the light conductor plate of the lighting unit by ultraviolet curable or visible light curable optical adhesive. Also, a support plate may be disposed between the two lighting units, and the light transmissive member may be mounted on the support plate, in which case a light reflective film may be disposed between the light transmissive member and the support plate.

In the aspect of the present invention, a treatment to increase light reflectance may be applied to the inclined surface of the light transmissive member.

Due to the treatment for increasing light reflectance applied to the inclined surface of the light transmissive member, the hot spot light or the sharp emission line light introduced into the light transmissive member can be efficiently reflected so as to further travel in the light transmissive member thus producing more effective light. The treatment may be performed for example such a metallic thin film of silver or the like having a high reflectance or an optical thin film of dielectric multiplayer film is formed on the inclined surface by vapor deposition or sputtering, or that a light reflective film is adhesively attached to the inclined surface.

In the aspect of the present invention, a means to convert an optical path of the light emitted from the light source and reflected at the inclined surface may be formed at at least one major surface of the light transmissive member.

Due to the optical path converting means formed at at least one major surface of the light transmissive member, the light reflected at the inclined surface of the light transmissive member so as to further travel in the light transmissive member has its optical path efficiently converted and exits from the light outlet surface. The optical converting means may be constituted by a plurality of regular grooves like a prism array or a plurality of minute dots.

Accordingly, the spread illuminating apparatus of multiple panel type according to the present invention surely achieves a uniform brightness without influence of stray light while achieving a reduction in power consumption.

BRIEF DESCRIPTION OF THE DRAWINGS

FIG. 1 is a perspective view of a spread illuminating apparatus of multiple panel type according an embodiment of the present invention;

FIGS. 2A and 2B are respectively an exploded enlarged perspective view and an enlarged perspective view of a part of the spread illuminating apparatus of FIG. 1;

FIGS. 5A to 5C are overall brightness distribution maps of various spread illuminating apparatuses of multiple panel type, wherein FIG. 5A shows a brightness distribution of the spread illuminating apparatus of multiple panel type according to the embodiment of the present invention, FIG. 5B shows a brightness distribution of a conventional spread illuminating apparatus of multiple panel type, and FIG. 5C shows a brightness distribution of the conventional spread illuminating apparatus of multiple panel type without providing cover films working as measures to deal with stray light problems.

DETAILED DESCRIPTION OF THE INVENTION

Figure 3:
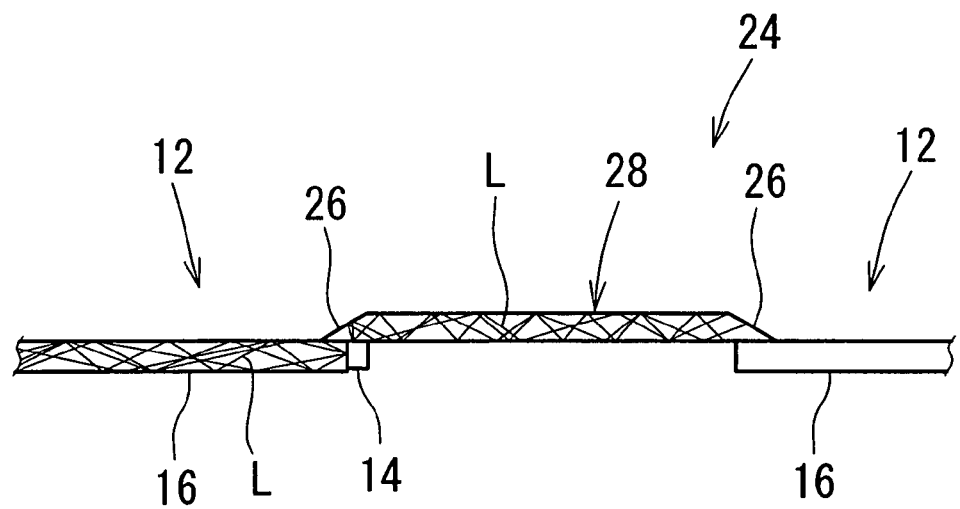
FIG. 3 is a schematic side view of a relevant part of the spread illuminating apparatus of FIG. 1, showing optical paths of lights emitted from a light source into both a light conductor plate of a lighting unit and a subsidiary light conductor plate.

An exemplary embodiment of the present invention will hereinafter be described with reference to the accompanying drawings, wherein any components identical with or corresponding to those of the aforementioned conventional art are denoted by the same reference numerals, and a detailed description thereof will be omitted below.

Referring to FIG. 1 and FIGS. 2A and 2B, a spread illuminating apparatus of multiple panel type (hereinafter referred to simply as "spread illuminating apparatus") 22 according to an embodiment of the present invention includes a plurality of lighting units 12 each of which includes LEDs 14 as light sources and a light conductor plate 16, and which are arranged two dimensionally. The light conductor plate 16 has a major surface as a light outlet surface and a side surface as a light inlet surface at which the LEDs 14 are disposed. The lighting units 22 are arrayed with the light inlet surfaces of their light conductor plates 16 facing in the same direction, such that every two lighting units 12 adjacent to each other with respect to a direction orthogonal to the light inlet surface of the light conductor plate 16 are disposed apart from each other so as to provide a predetermined distance X (FIG. 2B) between respective opposing ends of the light conductor plates 16. And, a subsidiary light conductor plate 24 is disposed to bridge over the predetermined distance X between the respective opposing ends of the light conductor plates 16 of the two adjacent lighting units 22 such that both end regions of the subsidiary light conductor plate 24 sit on the light outlet surface sides of respective opposing end regions of the light conductor plates 16 of the two adjacent lighting units 12.

The subsidiary light conductor plate 24 may be fixed to the light conductor plate 16 of the lighting unit 12 by ultraviolet curable or visible light curable optical adhesive. Also, though not shown, a support plate may be disposed between the two adjacent lighting units 12, and the subsidiary light conductor plate 16 may be mounted on the support plate, in which case a light reflective film may be disposed between the subsidiary light conductor plate 16 and the support plate.

The subsidiary light conductor plate 24 is a light transmissive member adapted to reflect and diffuse leakage lights from the LEDs 14 of the lighting unit 22. Referring to FIGS. 2A and 2B, the subsidiary light conductor plate 24 includes a major surface (light outlet surface) 28, and two end surfaces (inclined surfaces) 26 formed respectively at both ends of the light outlet surface 28 so as to overlap with the respective opposing end regions of the light conductor plates 16 of the two adjacent lighting units 12 and to at least partly cover the LEDs 14 thereby reflecting leakage lights from the LEDs 14 as much as possible.

A treatment to increase light reflection is applied to the inclined surfaces 26 of the subsidiary light conductor plate 24, specifically, for example, in such a manner that a thin film of silver or like metals having a high reflectance or an optical thin film of a dielectric multilayer film is formed on the inclined surfaces 26 by a method of vapor deposition or sputtering, or alternatively that a light reflective film is adhesively attached to the inclined surfaces 26. And, an optical path converting means to convert the lights reflected at the inclined surfaces 26 is formed at least at one major surface (the light outlet surface 28) of the subsidiary light conductor plate 24. The optical path converting means may be constituted by, for example, a plurality of regular grooves like a prism array, or minute dots.

FIG. 3 schematically shows optical paths L of lights emitted from the LED 14 into both the light conductor plate 16 and the subsidiary light conductor plate 24 in the spread illuminating apparatus of FIG. 1. As shown in FIG. 3, primary lights from the LED 4 are introduced into the light conductor plate 16 while leakage or stray lights from the LED 4 are introduced into the subsidiary light conductor plate 24 with some thereof reflected at the inclined surface 26 to further travel in the subsidiary light conductor plate 24 and finally exit from the light outlet surface 28 as effective lights.

Figure 4:
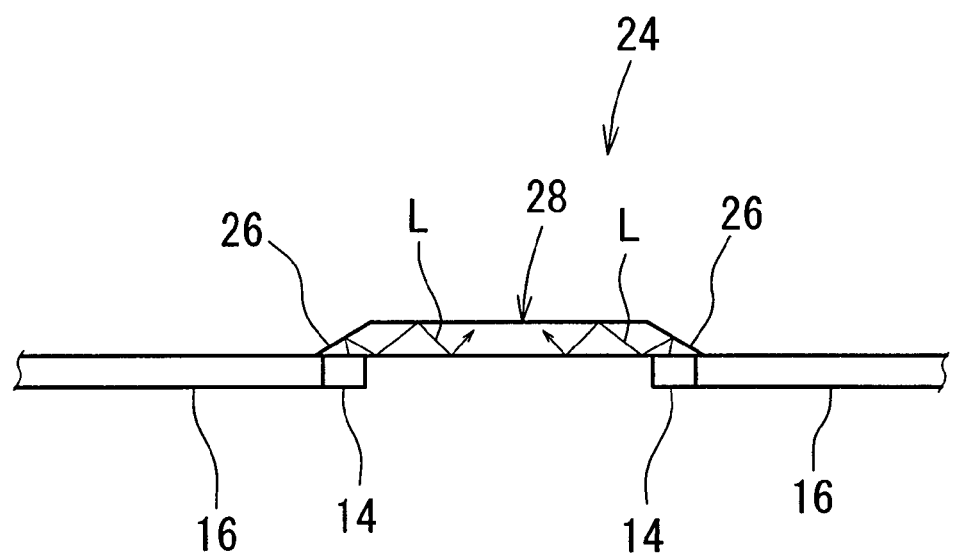
FIG. 4 is schematic side view of optical paths of lights emitted from light sources into a subsidiary light conductor plate when a light source disposition arrangement differs from that of FIG. 3.

Also, as shown in FIG. 4, when a light source disposition arrangement is made such that the LEDs 14 are disposed at both of respective opposing end surfaces of the light conductor plates 16 of the two adjacent lighting units 12, leakage or stray lights emitted from the LEDs 14 disposed at the both opposing end surfaces of the light conductor plates 16 are reflected at the inclined surfaces 26, take optical paths L to further travel in the subsidiary light conductor plate 24, and finally exit from the light outlet surface 28 as effective lights while traveling.

The spread illuminating apparatus 22 as described above according to the present invention achieves the following advantages.

The spread illuminating apparatus 22 includes the plurality of lighting units 12, each of which includes the LEDs 14 and the light conductor plate 16 having a light outlet surface and a light inlet surface provided with the LEDs 14 and which are arranged two dimensionally, and thus constitutes a multiple panel type backlight with a large light emitting area so as to be suitable for a large LCD. The spread illuminating apparatus 22 further includes a light transmissive member as the subsidiary light conductor plate 24, which is disposed at the light outlet surface side of the light conductor plate 16, has the inclined surfaces 26, and which is adapted to reflect and diffuse leakage lights from the LEDs 14. The leakage lights emitted from the LEDs 14 and introduced into the subsidiary light conductor plate (light transmissive member) 24 are diffused and reflected, which results in reducing stray lights viewable from the light outlet surface side of the light conductor plate 16, and at the same time the leakage lights introduced into the subsidiary light conductor plate 24 are caused to exit from the light outlet surface 28, which contributes to enhancing the overall brightness of the spread illuminating apparatus 22 in a uniform manner. Unlike the cover film 18 (see FIG. 6A/6B) conventionally used to overcome the stray light problem, the subsidiary light conductor plate 24 is not required to shield or reflect light but is adapted to allow light to get thereinto and exit therefrom thus making an effective use of stray lights. Accordingly, the brightness of the spread illuminating apparatus 22 can be surely enhanced in a uniform manner without influence of the stray lights from the LEDs 14 while preventing an increase in power consumption on the LEDs 14.

Figure 5:
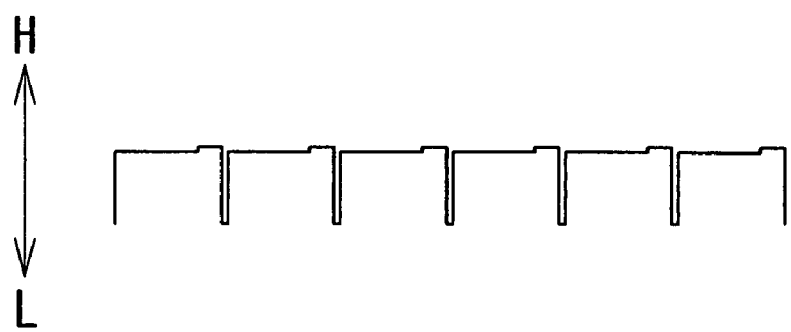
Figure 5:
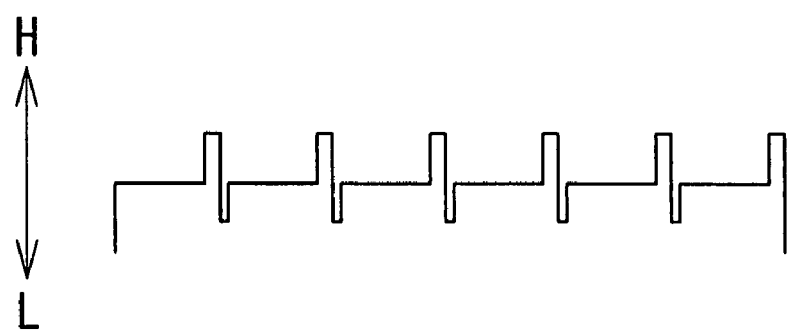

FIG. 5A shows the overall brightness distribution of the spread illuminating apparatus 22 taken with respect to the direction (indicated by arrow A in FIG. 1) oriented orthogonal to the light inlet surface of the light conductor plate 16 so as to cross all the light inlet surfaces at which the LEDs 14 of the lighting units 12 are disposed. In the figure, H indicates high brightness, and L indicates low brightness. As shown in FIG. 5A, a uniform brightness is achieved across the entire luminous area of the spread illuminating apparatus 22.

Figure 6A:
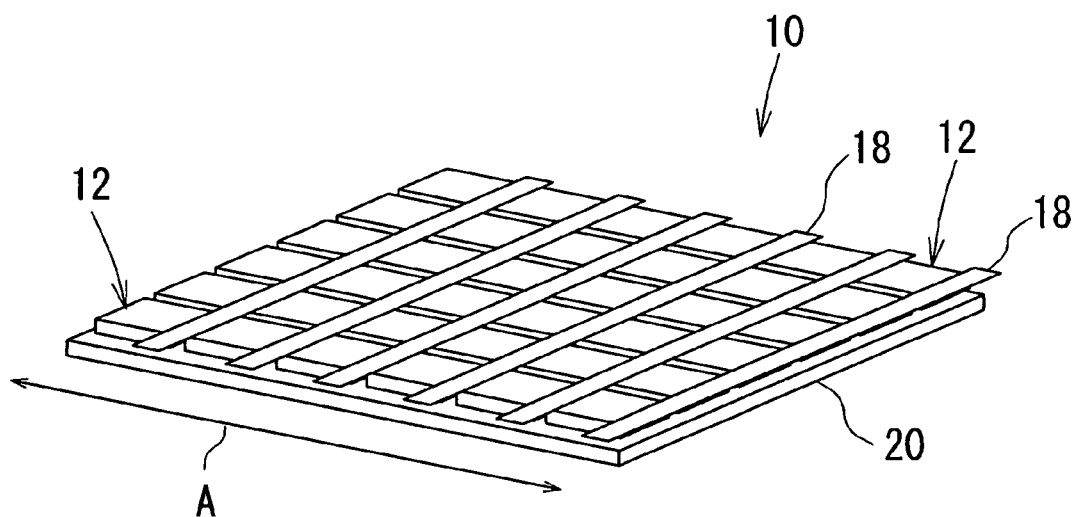
FIGS. 6A and 6B are respectively a schematic perspective view and an exploded perspective view of a conventional spread illuminating apparatus of multiple panel type.
Figure 6B:
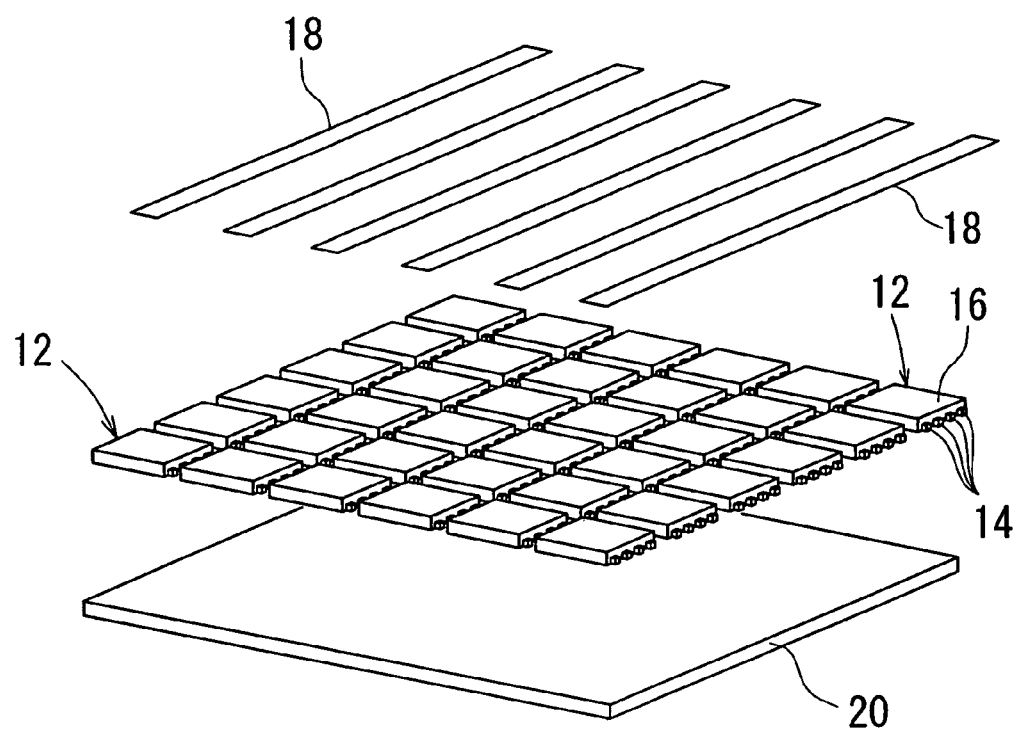

FIG. 5B shows the overall brightness distribution of the conventional spread illuminating apparatus 10 of FIG. 6A taken following FIG. 5A for comparison purpose, specifically with respect to the direction indicated by arrow A in FIG. 6A. The portions of the distribution exhibiting a low brightness correspond to the areas positioned above the LEDs 14 and light inlet surfaces of the light conductor plates 16, where the cover films 18 are placed. Thus, it is known that the brightness distribution is effected by the cover films 18.

FIG. 5C shows, for reference purpose, the overall brightness distribution of the conventional spread illuminating apparatus 10, which, however, eliminates the cover films 18. The portions of the distribution exhibiting a high brightness correspond to the aforementioned areas positioned above the LEDs 14 and light inlet surfaces of the light conductor plates 16 but not provided with the cover films 18 thereabove. From FIGS. 5B and 5C, it is clear that the cover film 18 is effective in blocking the stray light but does not contribute to successfully achieving a uniform brightness distribution.

In the spread illuminating apparatus 22 according to the present invention, the subsidiary light conductor plate 24 is used as means to reflect and diffuse leakage lights from the LEDs 14, and the inclined surface 26 is formed at least at one end of the subsidiary light conductor plate 24. Hot spot lights generated by the LEDs 14 and sharp emission line lights generated at the light inlet surface area of the light conductor plate 16 are introduced into the subsidiary light conductor plate 24 from its bottom surface and reflected at the inclined surface 26 so as to further travel in the subsidiary light conductor plate 24 (see FIGS. 3 and 4) and to exit from the light outlet surface 28 as effective lights while traveling.

The lighting units 12 are arranged two dimensionally such that the prescribed distance X is provided between respective opposing ends of the light conductor plates 16 of every two lighting units 12 adjacent to each other with respect to the direction orthogonal to the light inlet surface of the light conductor plate 16, wherein the subsidiary light conductor 24 is disposed to cover an open space defined by the prescribed distance X provided between the light conductor plates 16 of every two adjacent lighting units 12 such that the end regions of the subsidiary light conductor plate 24 sit on the light outlet surface sides of the respective opposing end regions of the light conductor plates 16 of the two adjacent lighting units 12. Thus, the spread illuminating apparatus 22 is structured such that the lighting units 12 are arranged two dimensionally with the prescribed distance X provided between the light conductor plates 16 of every two adjacent lighting units 12 with respect to one dimensional direction, rather than leaving no space therebetween, and that the subsidiary light conductor plates 24 are each disposed to bridge over the open space between the two adjacent lighting units 12, whereby a multiple panel type backlight with a large luminous area is achieved. The subsidiary light conductor plate 24 to bridge between two lighting units 12 functions to reduce stray lights viewable from the light outlet surface side of the light conductor plate 16 and at the same time to utilize leakage lights from the LEDs 14 as effective light, whereby the overall brightness of the spread illuminating apparatus 22 can be enhanced. Also, since the lighting units 12 are arranged with an open space between two adjacent lighting units 12, the number of the lighting units 12 is reduced for the same luminous area and therefore the power consumption can be reduced.

Further, since the inclined surface 26 of the subsidiary light conductor plate 24 is provided with a treatment of increasing light reflection by, for example, forming thereon an optical thin film having a high reflectance by a method of vapor deposition or sputtering, or by attaching thereto a light reflective film by adhesive, hot spot lights generated by the LEDs 14 and sharp emission line lights generated at the light inlet surface area of the light conductor plate 16, which are introduced into the subsidiary light conductor plate 24 from its bottom surface, are efficiently reflected at the inclined surface 26 to further travel in the subsidiary light conductor plate 24 and to exit from the light outlet surface 28 as effective lights while traveling.

And, the light outlet surface 28 of the subsidiary light conductor plate 24 is provided with the optical path converting means (for example, a plurality of regular grooves or minute dots) adapted to cause the lights reflected at the inclined surface 26 to take the optical paths L, whereby the lights L are caused to efficiently exit from the light outlet surface 28 as effective lights while traveling in the subsidiary light conductor plate 24.

While the present invention has been illustrated and explained with respect to the exemplary embodiment, it is to be understood that the present invention is by no means limited thereto but encompasses all changes and modifications that will become possible within the scope of the appended claims.

What is claimed is:

1. A spread illuminating apparatus comprising:
a plurality of lighting units each of which comprises a light conductor plate having a light-conductor surface as a light outlet surface, the light-conductor surface emitting light from a top surface of the light-conductor surface, and a side surface as a light inlet surface, and a light source disposed at the light inlet surface of the light conductor plate, and which are arranged two dimensionally; and
a plurality of light transmissive members each of which is provided with means to reflect and diffuse light from the light source, and each of which is disposed at a light outlet surface side of each of the lighting units, wherein each of the plurality of light transmissive members emit light from a top surface of each of the light transmissive members,
wherein the plurality of lighting units are arranged such that a predetermined distance is provided between respective opposing ends of the light conductor plates of at least two lighting units adjacent to each other with respect to a direction orthogonal to the light inlet surface of the light conductor plate, and
wherein the light transmissive members bridge the respective opposing ends of the light conductor plates of the at least two adjacent lighting units such that an end region of one of the light transmissive members attaches respective opposing end regions at the top surface of the light conductor plates of the at least two adjacent lighting units so as to directly cover the light source.

2. A spread illuminating apparatus according to claim 1, wherein the light transmissive members each comprise: an inclined surface formed at least at one end thereof and working as a means to reflect the light from the light source; and the light transmissive members functioning as a subsidiary light conductor plate.

3. A spread illuminating apparatus according to claim 2, wherein a treatment to increase light reflectance is applied to the inclined surface of each of the light transmissive members.

4. A spread illuminating apparatus according to claim 2, wherein a means to convert an optical path of the light emitted from the light source and reflected at the inclined surface is formed at least at one light-transmissive surface of each of the light transmissive members.

5. A spread illuminating apparatus according to claim 2, Wherein the light transmissive members are disposed in a repeating geometry, and the plurality of lighting units are disposed in a respective repeating geometry corresponding to a size of a panel to be lighted.

6. The spread illuminating apparatus according to claim 1, wherein the light source contacts the light inlet surface of the light conductor plate.

7. The spread illuminating apparatus according to claim 1, wherein each of the light transmissive members reflect and diffuse light from the light source outside of the apparatus directly and indirectly.

8. The spread illuminating apparatus according to claim 1, wherein the end regions of each of the light transmissive members contact respective opposing end regions of the light conductor plates.

* * * * *